Nov. 3, 1953
C. A. KERNER
2,657,947
ROAD-RAIL WHEEL
Filed July 23, 1951
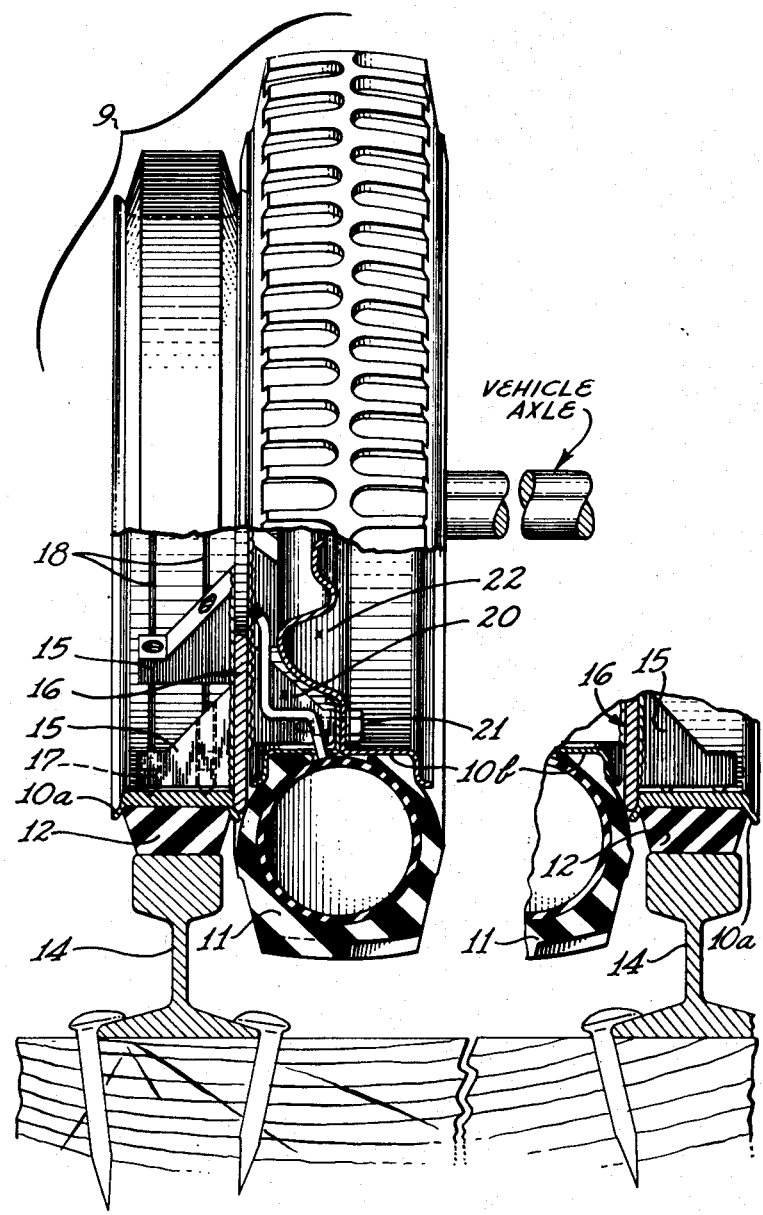
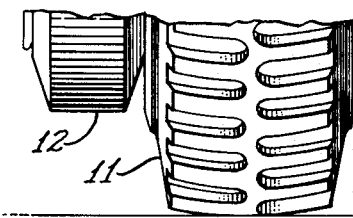
INVENTOR:
Charles A. Kerner
By Herbert E. Metcalf
HIS PATENT ATTORNEY Patented Nov. 3, 1953

2,657,947

UNITED STATES PATENT OFFICE 2,657,947

ROAD-RAIL WHEEL

Charles A. Kerner, Los Angeles, Calif., assignor to Northrop Aircraft, Inc., Hawthorne, Calif., a corporation of California Application July 23, 1951, Serial No. 238,177

2 Claims. (Cl. 295—8.5)

The present invention relates to vehicle wheels and more particularly to a road-rail wheel for vehicles.

Certain vehicles, including automotive types which are commonly known as "jeeps" for example, have been found to be highly useful for towing and carrying purposes in railborne traffic. To this end it is desirable to provide wheels which will enable such vehicles, when equipped therewith, to run on both rails and roads.

It is therefore one of the objects of the present invention to provide a dual-purpose wheel which will enable vehicles, when provided with a set thereof, to efficiently travel on rails as well as on roads, at will and without change in wheels or tires.

Briefly, the present invention provides a vehicle wheel having a composite tire mounting means, one of the mounting means carrying a road tire, preferably of the usual pneumatic rubber type, the other mounting means carrying a rail tire, preferably of the solid rubber type. The solid rail tire is made smaller in outside diameter than the road tire, and is positioned to travel on a rail of a two rail track outwardly of the road tire; the road tire being spaced by a distance from the rail tire so as to flange the inner side of a rail, thereby preventing the rail tire from leaving the rail.

The present invention will be more clearly understood by reference to the specification drawings wherein:

Figure 1 is an end elevational view, partially cut away to show one preferred construction of the present invention in cross-section.

Figure 2 is an end elevational view of the lower portion of the present invention which is shown in Figure 1.

In the particular embodiment shown in Figures 1 and 2, a wheel 9 of the usual automotive type, is provided with a pair of flanged tire-mounting rims 10a and 10b. The inner rim 10b carries a pneumatic rubber tire 11 of the usual type for road travel. The outer rim 10a mounts a tire 12 which is suitable for travel on a rail 14 of a two rail track for example, and is preferably made of a resilient material such as solid rubber. The solid rubber rail tire 12 and the road tire 11 are retained on the flanged rims 10a and 10b in the customary manner.

The outer rim 10a is concentrically fastened to a circular metal plate 16 by a number of brackets 15 which are spaced around the outer side of the plate 16 and securely welded in place. Set screws 17 mounted in each bracket 15 and seated in grooves 18 which are provided around the inner perimeter of the rim 10a, firmly retain the rim 10a in place. The circular plate 16 also has a number of brackets 20 evenly spaced around the surface on the inner side thereof and welded thereto, being attached by means of machine screws 21 to the wheel web 22.

The outside diameter of the rail tire 12 is sufficiently smaller than that of the road tire 11 so that when the rail tire 12 is positioned on a rail 14, the road tire 11, being spaced by a proper distance from the rail tire 12, flanges the rail 14 on the inner side thereof, thereby preventing the rail tire 12 from leaving the rail during travel thereon.

When the vehicle on which the wheels of the present invention is traveling on a road, the road contact is of course made solely by the pneumatic tire 11. Under these conditions the rail tire 12, being of lesser diameter than the pneumatic tire 11 simply idles as shown in Figure 2.

While the particular construction of the wheel shown and described above provides a demountable rim and rail tire, it is obvious that both tire mounting means can be made in a single unit integral with the wheel, and in some cases such construction may be preferable.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A road-rail wheel, comprising a vehicle wheel having a pair of tire mounting rims held together by rim attachment means, a solid rubber tire mounted on one of said rims, a pneumatic rubber tire mounted on the other said rim, said solid tire being positioned to traverse a rail of a two rail track outwardly of said pneumatic tire, said solid rubber tire having a smaller outside diameter than said pneumatic tire, said pneumatic tire being spaced by a distance from said solid tire to flange the side of said rail facing the other rail of said track, and said rim attachment means comprising a mounting member rigidly attached to the rim carrying said pneumatic rubber tire, a plurality of bracket members fixed to said mounting member and arranged in a circle around the axis of revolution of said wheel, with a surface of each bracket facing outwardly of said circle, the diameter of the circle of said surfaces being slightly less than the inner diameter of the rim carrying said solid rubber tire, a plurality of annular grooves cut in the inner-facing portion of said solid tire rim, and a plurality of set screws threaded in said brackets and pointing outwardly through said bracket surfaces, and said set screws seated in said grooves when said solid tire rim is in attached position, whereby said latter rim can be adjusted in any radial direction to occupy a position exactly coaxial with the other rim.

2. In a dual wheel having a first rim for mounting a rail tire, and a second rim for mounting a road tire adjacent and coaxial with said rail tire so that said road tire will flange a rail on which said rail tire is positioned to ride, the improvement of rim attaching means comprising a mounting ring member rigidly attached to said second rim, a plurality of bracket members fixed to said mounting ring and arranged in a circle around the axis of revolution of said wheel, with a surface of each bracket facing outwardly of said circle, the diameter of the circle of said surfaces being slightly less than the inner diameter of said first rim, a plurality of annular grooves cut in the inner-facing portion of said first rim, and a plurality of set screws threaded in said brackets and pointing outwardly through said bracket surfaces, and said set screws seated in said grooves when said first rim is in attached position, whereby said first rim can be adjusted in any radial direction to occupy a position exactly coaxial with said second rim.

CHARLES A. KERNER.

References Cited in the file of this patent

UNITED STATES PATENTS

| Number | Name | Date |
|---|---|---|
| 963,304 | McFarren | July 5, 1910 |
| 1,424,314 | Marien | Aug. 1, 1922 |
| 1,560,233 | Hickey | Nov. 3, 1925 |
| 1,988,792 | Harry | Jan. 22, 1935 |

FOREIGN PATENTS

| Number | Country | Date |
|---|---|---|
| 736,563 | France | Nov. 25, 1932 |